US009772979B1

(12) United States Patent
Young et al.

(10) Patent No.: US 9,772,979 B1
(45) Date of Patent: Sep. 26, 2017

(54) REPRODUCING USER BROWSING SESSIONS

(75) Inventors: Samuel J. Young, Seattle, WA (US); Ivan King Yu Sham, Seattle, WA (US); Brett R. Taylor, Bainbridge Island, WA (US); Ameet N. Vaswani, Seattle, WA (US); David A. Killian, Seattle, WA (US); Peter F. Hill, Seattle, WA (US); Ranganath Atreya, Kirkland, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 1041 days.

(21) Appl. No.: 13/570,187

(22) Filed: Aug. 8, 2012

(51) Int. Cl.
*G06F 17/00* (2006.01)
*G06F 17/22* (2006.01)
*G06Q 30/02* (2012.01)

(52) U.S. Cl.
CPC ......... *G06F 17/2247* (2013.01); *G06Q 30/02* (2013.01)

(58) Field of Classification Search
CPC ............................ G06Q 30/02; G06F 17/2247
USPC .................................................. 715/234, 200
See application file for complete search history.

(56) References Cited

U.S. PATENT DOCUMENTS

| 5,634,064 | A | 5/1997 | Warnock et al. |
| 5,872,850 | A | 2/1999 | Klein et al. |
| 5,961,593 | A | 10/1999 | Gabber et al. |
| 6,049,812 | A | 4/2000 | Bertram et al. |
| 6,108,637 | A | 8/2000 | Blumenau |
| 6,138,156 | A | 10/2000 | Fletcher et al. |
| 6,195,679 | B1 | 2/2001 | Bauersfeld et al. |
| 6,430,624 | B1 | 8/2002 | Jamtgaard et al. |
| 6,549,941 | B1 | 4/2003 | Jaquith et al. |
| 6,560,620 | B1 | 5/2003 | Ching |
| 6,625,624 | B1 | 9/2003 | Chen et al. |
| 6,704,024 | B2 | 3/2004 | Robotham et al. |
| 6,785,864 | B1 | 8/2004 | Te et al. |
| 6,871,236 | B2 | 3/2005 | Fishman et al. |
| 6,877,007 | B1 * | 4/2005 | Hentzel ................. G06Q 30/02 707/999.01 |
| 6,944,665 | B2 | 9/2005 | Brown et al. |

(Continued)

FOREIGN PATENT DOCUMENTS

WO    WO 2013/003631 A2    1/2013

OTHER PUBLICATIONS

Liu et al.m Understanding Web Browsing Behaviors through Weibull Analysis of Dwell Time, Published 2010, ACM, pp. 1-8.*

(Continued)

*Primary Examiner* — Manglesh M Patel
(74) *Attorney, Agent, or Firm* — Knobbe Martens Olson & Bear LLP (57) ABSTRACT

Features are disclosed for determining a sequence of content, including but not limited to web pages, that a user of a client device is likely to request or otherwise find interesting based on previous content requests (of that user and/or other users), and to making the sequence of content available for viewing on the client device. The identified pattern may later be used as a basis to prefetch the content, and to make the sequence of prefetched content available on the client device as a "suggested browsing session." The suggested browsing session may include a sequence of content pages typically requested by the user, and/or may include linked pages and recommendations that the user is otherwise likely to find interesting.

31 Claims, 6 Drawing Sheets

(56) References Cited

U.S. PATENT DOCUMENTS

| | | | |
|---|---|---|---|
| 6,963,850 B1 | 11/2005 | Bezos et al. | |
| 7,003,442 B1 | 2/2006 | Tsuda | |
| 7,051,084 B1 | 5/2006 | Hayton et al. | |
| 7,054,900 B1* | 5/2006 | Goldston | 709/203 |
| 7,054,952 B1 | 5/2006 | Schwerdtfeger et al. | |
| 7,085,736 B2 | 8/2006 | Keezer et al. | |
| 7,159,023 B2 | 1/2007 | Tufts | |
| 7,171,478 B2 | 1/2007 | Lueckhoff et al. | |
| 7,191,211 B2 | 3/2007 | Tuli | |
| 7,353,252 B1 | 4/2008 | Yang et al. | |
| 7,373,313 B1 | 5/2008 | Kahle et al. | |
| 7,376,588 B1* | 5/2008 | Gregov et al. | 705/27.1 |
| 7,543,059 B2 | 6/2009 | Johnson et al. | |
| 7,685,022 B1* | 3/2010 | Heyworth et al. | 705/26.8 |
| 7,720,720 B1* | 5/2010 | Sharma et al. | 705/26.7 |
| 7,792,944 B2 | 9/2010 | DeSantis et al. | |
| 7,831,582 B1 | 11/2010 | Scofield et al. | |
| 7,975,000 B2 | 7/2011 | Dixon et al. | |
| 7,996,912 B2 | 8/2011 | Spalink et al. | |
| 8,010,545 B2 | 8/2011 | Stefik et al. | |
| 8,015,496 B1 | 9/2011 | Rogers | |
| 8,060,463 B1 | 11/2011 | Spiegel | |
| 8,073,850 B1 | 12/2011 | Hubbard et al. | |
| 8,095,523 B2* | 1/2012 | Brave et al. | 707/705 |
| 8,103,742 B1 | 1/2012 | Green | |
| 8,117,085 B1* | 2/2012 | Smith | 705/26.7 |
| 8,185,621 B2 | 5/2012 | Kasha | |
| 8,249,904 B1 | 8/2012 | DeSantis et al. | |
| 8,271,887 B2 | 9/2012 | Offer et al. | |
| 8,316,124 B1 | 11/2012 | Baumback et al. | |
| 8,321,793 B1* | 11/2012 | Cotter et al. | 715/745 |
| 8,336,049 B2 | 12/2012 | Medovich | |
| 8,370,203 B2* | 2/2013 | Dicker et al. | 705/14.53 |
| 8,438,052 B1* | 5/2013 | Chanda et al. | 705/7.11 |
| 8,560,964 B2* | 10/2013 | Dodson et al. | 715/819 |
| 8,918,331 B2* | 12/2014 | Edwards | G06Q 30/0272 705/14.4 |
| 2001/0039490 A1 | 11/2001 | Verbitsky et al. | |
| 2002/0030703 A1 | 3/2002 | Robertson et al. | |
| 2002/0194302 A1 | 12/2002 | Blumberg | |
| 2003/0023712 A1 | 1/2003 | Zhao et al. | |
| 2003/0041106 A1 | 2/2003 | Tuli | |
| 2004/0039657 A1* | 2/2004 | Behrens et al. | 705/26 |
| 2004/0083294 A1 | 4/2004 | Lewis | |
| 2004/0139208 A1 | 7/2004 | Tuli | |
| 2004/0181613 A1 | 9/2004 | Hashimoto et al. | |
| 2004/0205448 A1 | 10/2004 | Grefenstette et al. | |
| 2004/0220905 A1 | 11/2004 | Chen et al. | |
| 2004/0243622 A1 | 12/2004 | Morisawa | |
| 2005/0010863 A1 | 1/2005 | Zernik | |
| 2005/0060643 A1 | 3/2005 | Glass et al. | |
| 2005/0138382 A1 | 6/2005 | Hougaard et al. | |
| 2005/0183039 A1 | 8/2005 | Revis | |
| 2005/0246193 A1 | 11/2005 | Roever et al. | |
| 2006/0085766 A1 | 4/2006 | Dominowska et al. | |
| 2006/0095336 A1 | 5/2006 | Heckerman et al. | |
| 2006/0122889 A1 | 6/2006 | Burdick et al. | |
| 2006/0168510 A1 | 7/2006 | Bryar et al. | |
| 2006/0184421 A1 | 8/2006 | Lipsky et al. | |
| 2006/0248442 A1 | 11/2006 | Rosenstein et al. | |
| 2006/0259867 A1* | 11/2006 | Watson | G06F 17/30884 715/760 |
| 2006/0277167 A1 | 12/2006 | Gross et al. | |
| 2006/0294461 A1 | 12/2006 | Nadamoto et al. | |
| 2007/0022072 A1 | 1/2007 | Kao et al. | |
| 2007/0027672 A1 | 2/2007 | Decary et al. | |
| 2007/0088607 A1* | 4/2007 | Feierbach | G06Q 30/02 705/14.73 |
| 2007/0094241 A1 | 4/2007 | Blackwell et al. | |
| 2007/0124693 A1 | 5/2007 | Dominowska et al. | |
| 2007/0139430 A1 | 6/2007 | Korn et al. | |
| 2007/0240160 A1 | 10/2007 | Paterson-Jones et al. | |
| 2007/0288589 A1 | 12/2007 | Chen et al. | |
| 2008/0028334 A1 | 1/2008 | De Mes | |
| 2008/0104502 A1 | 5/2008 | Olston | |
| 2008/0183672 A1 | 7/2008 | Canon et al. | |
| 2008/0184128 A1 | 7/2008 | Swenson et al. | |
| 2008/0320225 A1 | 12/2008 | Panzer et al. | |
| 2009/0012969 A1 | 1/2009 | Rail et al. | |
| 2009/0164924 A1 | 6/2009 | Flake et al. | |
| 2009/0204478 A1 | 8/2009 | Kaib et al. | |
| 2009/0217199 A1 | 8/2009 | Hara et al. | |
| 2009/0248680 A1 | 10/2009 | Kalavade | |
| 2009/0254867 A1 | 10/2009 | Farouki et al. | |
| 2009/0282021 A1 | 11/2009 | Bennett | |
| 2009/0287698 A1 | 11/2009 | Marmaros et al. | |
| 2009/0327914 A1 | 12/2009 | Adar et al. | |
| 2010/0036740 A1 | 2/2010 | Barashi | |
| 2010/0057639 A1 | 3/2010 | Schwarz et al. | |
| 2010/0125507 A1 | 5/2010 | Tarantino, III et al. | |
| 2010/0131594 A1 | 5/2010 | Kashimoto | |
| 2010/0138293 A1 | 6/2010 | Ramer et al. | |
| 2010/0218106 A1 | 8/2010 | Chen et al. | |
| 2010/0293190 A1 | 11/2010 | Kaiser et al. | |
| 2010/0312788 A1 | 12/2010 | Bailey | |
| 2010/0318892 A1 | 12/2010 | Teevan et al. | |
| 2010/0332513 A1 | 12/2010 | Azar et al. | |
| 2011/0022957 A1 | 1/2011 | Lee | |
| 2011/0029854 A1 | 2/2011 | Nashi et al. | |
| 2011/0054999 A1* | 3/2011 | Attenberg | G06F 17/30864 705/14.43 |
| 2011/0055203 A1 | 3/2011 | Gutt et al. | |
| 2011/0078140 A1 | 3/2011 | Dube et al. | |
| 2011/0078705 A1 | 3/2011 | Maclinovsky et al. | |
| 2011/0119661 A1 | 5/2011 | Agrawal et al. | |
| 2011/0161849 A1 | 6/2011 | Stallings et al. | |
| 2011/0173177 A1 | 7/2011 | Junqueira et al. | |
| 2011/0173637 A1 | 7/2011 | Brandwine et al. | |
| 2011/0178868 A1 | 7/2011 | Garg et al. | |
| 2011/0185025 A1 | 7/2011 | Cherukuri et al. | |
| 2011/0191327 A1 | 8/2011 | Lee | |
| 2011/0197121 A1 | 8/2011 | Kletter | |
| 2011/0246873 A1 | 10/2011 | Tolle et al. | |
| 2011/0289074 A1 | 11/2011 | Leban | |
| 2011/0296341 A1 | 12/2011 | Koppert | |
| 2011/0302510 A1 | 12/2011 | Harrison et al. | |
| 2012/0072821 A1 | 3/2012 | Bowling | |
| 2012/0084644 A1 | 4/2012 | Robert et al. | |
| 2012/0096365 A1 | 4/2012 | Wilkinson et al. | |
| 2012/0110017 A1 | 5/2012 | Gu et al. | |
| 2012/0137201 A1 | 5/2012 | White et al. | |
| 2012/0143944 A1 | 6/2012 | Reeves et al. | |
| 2012/0150844 A1 | 6/2012 | Lindahl et al. | |
| 2012/0166922 A1 | 6/2012 | Rolles | |
| 2012/0198516 A1 | 8/2012 | Lim | |
| 2012/0215834 A1 | 8/2012 | Chen et al. | |
| 2012/0215919 A1 | 8/2012 | Labat et al. | |
| 2012/0284629 A1 | 11/2012 | Peters et al. | |
| 2012/0317295 A1 | 12/2012 | Baird et al. | |
| 2012/0331406 A1 | 12/2012 | Baird et al. | |
| 2013/0007101 A1 | 1/2013 | Trahan et al. | |
| 2013/0007102 A1 | 1/2013 | Trahan et al. | |
| 2013/0031461 A1 | 1/2013 | Hou et al. | |
| 2013/0080611 A1 | 3/2013 | Li et al. | |
| 2013/0238433 A1* | 9/2013 | Kamdar | G06Q 30/0241 705/14.53 |

OTHER PUBLICATIONS

Baumann, A., et al., Enhancing STEM Classes Using Weave: A Collaborative Web-Based Visualization Environment, Integrated Stem Education Conference, Apr. 2, 2011, Ewing, New Jersey, pp. 2A-1-2A-4.

De Carvalho, L.G., et al., Synchronizing Web Browsing Data With Browserver, Proceedings of the IEEE Symposium on Computers and Communications, Jun. 22-25, 2010, Riccione, Italy, pp. 738-743.

Rao, H.C.-H.,et al., "A Proxy-Based Personal Web Archiving Service," Operating Systems Review, 35(1):61-72, 2001.

Teevan, J., et al., "Changing How People View Changes on the Web," 2009, Proceedings of the 22$^{nd}$ Annual ACM Symposium on User Interface Software and Technology, New York, 2009, pp. 237-246.

(56) References Cited

OTHER PUBLICATIONS

Chen, H., et al., "Bringing Order to the Web: Automatically Categorizing Search Results," Proceedings of the SIGCHI Conference on Human Factors in Computing Systems, Apr. 1-6, 2000, pp. 145-152.
Bango, Rey "How JS & Ajax work in Opera Mini 4", Nov. 2, 2007, XP055050107, Retrieved from the Internet.
Brinkmann, M, "Record and Share your browser history with Hooeey," ghacks.net, Feb. 26, 2008, 6 pages, printed on Jan. 25, 2013.
Considine, A, "The Footprints of Web Feet," The New York Times, Mar. 4, 2011, 3 pages, printed on Jan. 25, 2013.
EyeBrowse: Record, Visualize and Share your Browser History, Information Aesthetics, Sep. 18, 2009, 2 pages, printed on Jan. 25, 2013.
Feuerstein, Adam, "Flyswat Takes Aim," San Francisco Business Times, printed from http://www.bizjournals.com/sanfrancisco/stories/1999/10/25/story2.html?t=printable, Oct. 22, 1999, 2 pages.
Gabber et al., "How to Make Personalized Web Browsing Simple, Secure, and Anonymous," Financial Cryptography, 16 pages (1997).
Gingerich, Jason, "Keycorp Making Site Into Portal," KRTBN Knight-Ridder Tribune Business News (South Bend Tribune, Indiana), Oct. 25, 1999, 2 pages.
Hopper, D. Ian, "Desktops Now Have Power to Comparison-Shop," Oct. 18, 1999, printed from http://www.cnn.com/TECH/computing/9910/18/r.u.sure/index.html, 3 pages.
Van Kleek, M, Introducing "Eyebrowse"—Track and share your web browsing in real time, Haystack Blog, Aug. 28, 2009, 3 pages, printed on Jan. 25, 2013.
Web page titled "RSS Ticker: Add-ons for Firefox," https://addons.mozilla.org/en-US/firefox/addon/rss-ticker/, 3 printed pages, printed on Feb. 7, 2013.
Web page titled "What Internet Users Do on a Typical Day, Trend Data (Adults), Pew Internet & American Life Project," printed from http://pewinternet.org/Static-Pages/Trend-Data-(Adults)/Online-Activities-Daily.aspx on Nov. 29, 2012, 4 pages.
Close 'n' Forget Firefox add on, Evilfantasy's blog, http://evilfantasy.wordpress.com/2009/03/24/close-%E2%80%98n%E2%80%99-forget-firefox-add-on/, retrieved Mar. 24, 2009, 1 page.

\* cited by examiner

REPRODUCING USER BROWSING SESSIONS

BACKGROUND

In a network communication environment, such as the Internet, a client computing device (client) may utilize a software browser application to initiate network connections with server computing devices (servers), and subsequently request content from those servers. Clients may be configured to cache content received from the servers. Subsequent requests for content may then be fulfilled from the cache, thereby avoiding additional requests to the server for the same content. Proxy servers can also be configured to cache content retrieved on behalf of a number of clients, storing the content in a shared cache and serving content from the cache in response to subsequent requests.

Some systems prefetch content from servers instead of or in addition to caching content requested by the user. In a typical application, a client generates a request for content, and some system determines which content the client is most likely to request next based on the current request. The client (or an intermediary proxy server) then retrieves that content prior to a user generating a request for the content. The prefetched content may be saved in the client cache so that it can be retrieved from the cache if the client subsequently requests the content.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

The present disclosure is directed to determining a sequence of content, including but not limited to web pages, that a user of a client device is likely to request or otherwise find interesting based on previous content requests (of that user and/or other users), and to making the sequence of content available for viewing on the client device. Specifically, the disclosure relates to the analysis of monitored user behaviors to identify a pattern of content requests and interactions. The identified pattern may later be used as a basis to prefetch the content, and to make the sequence of prefetched content available on the client device as a "suggested browsing session." The suggested browsing session may include a sequence of content pages typically requested by the user, and/or may include linked pages and recommendations that the user is otherwise likely to find interesting. The suggested browsing session may, for example, be presented by opening a sequence of browser tabs that can be selected by the user to view the prefetched content items. The analysis of user behaviors and the prefetching of content for the suggested browsing session may occur entirely at the client device, entirely at an intermediary system between the client device and content servers, or at some combination thereof.

Additional aspects of the disclosure relate to defining a suggested browsing session based on additional factors, such as the time of day or the location of the user. For example, a morning routine of requesting several web pages may be detected over a period of time. The sequence or the content pages may be different for the same user at a different time of the day, such as during the evening. The entire sequence may then be presented to the user when the user subsequently initiates a browsing session in the morning.

Further aspects of the disclosure relate to facilitating interaction with, or automated playback of, a suggested browsing session. Illustratively, as mentioned above, the suggested browsing session may be presented to the user as one or more background tabs of a tabbed browser interface, and the user may choose to activate any of the tabs at the user's discretion. Alternatively, the suggested browsing session may automatically be "played back" partially or in its entirety to a user without requiring any additional user interaction. For example each page may be automatically scrolled based on the user's reading speed, links that a user may be interested in can be activated, and subsequent tabs or pages may be navigated to based on a user's typical viewing time with each page. The browser may display "pause" and "play" buttons, or support touch screen gestures, for enabling the user to control the automatic play back.

Recommendations may be included in a suggested browsing session, and in some cases a browsing session consisting entirely of recommendations may be defined, such as a suggested browsing session of content related to a topic. The recommendations may be based on an aggregated analysis of content requests and interactions of a number of users and also the content requests and interactions of the target user.

Although aspects of the embodiments described in the disclosure will focus, for the purpose of illustration, on relationships and interactions between client devices, an intermediary system, and content servers, one skilled in the art will appreciate that the techniques disclosed herein may be applied to any number of hardware or software processes or applications. Further, although various aspects of the disclosure will be described with regard to illustrative examples and embodiments, one skilled in the art will appreciate that the disclosed embodiments and examples should not be construed as limiting. Various aspects of the disclosure will now be described with regard to certain examples and embodiments, which are intended to illustrate but not limit the disclosure.

With reference to an illustrative embodiment, a user of a client device may launch a browser application and submit a request to an intermediary system. The request may be for a content page or some other network-accessible resource, and the intermediary system may be configured to retrieve the requested resource on behalf of the user, optionally perform processing on the requested resource, and then transmit the resource to the client device. The intermediary system may record information about the request, such as which user made the request, the time of day, the geographic location of the client device from which the user made the request, the identity or address of the requested resource, client device characteristics such as form factor, and other data. Users may interact with requested content in any number of different ways. Content pages may be scrolled and zoomed, links within content pages may be activated, and so on. Data regarding these and other user interactions may be recorded by the browser application and reported to the intermediary system.

The intermediary system may analyze such content requests and interaction data to determine user preferences, predict user interests, and detect user browsing patterns. When a browsing pattern has been determined, a browsing session may be defined based on the pattern. The suggested browsing session may then be used to reproduce the browsing pattern for the user. If a user typically browses two news content pages, a sports-related page, and finally a social network site during the morning hours on a substantial number of days, a browsing session may be defined based on that sequence. Subsequently, when the user initiates a browsing session in the morning hours, the suggested browsing session may be used to launch each page in the sequence in a separate tab. The tab corresponding to the next page in the sequence may flash to the user after the typical amount of time spent on the current page has passed. Accordingly, a user need not manually request content pages during such a typical browsing session, but instead the user may be presented with the user's own browsing sequence automatically.

In some cases, user interactions with a suggested browsing session may also be automated. For example, the user may be presented with a typical morning browsing sequence, and scrolling or zooming of each content page may be performed automatically, based on an analysis of the user's interaction history with each content page. Navigating to the next content page in the sequence, activating a subsequent tab, and other user interface commands may also be performed automatically based on the user's interaction history.

The browser or intermediary system may also provide an option for the user to assign names or tags to suggested browsing sessions, and to use these names or tags to initiate corresponding sessions. In addition, the browser or intermediary system may provide an option for users to edit their suggested browsing session. The editing process may involve exposing editing buttons (such as "delete page," "add page," "reorder pages," etc. while the suggested session in being viewed. Further, the system may support the ability for a user to share a suggested browsing session with other users, such as members of the user's social network. For example, a browser may be configured to support a customized or standardized file format to save, import, and export suggested browsing sessions. The files may then be shared with other users and otherwise transferred to any various client devices.

Users may also be presented with individual content pages or entire suggested browsing sessions which are not based on sequences of content pages typically requested by a user, but which are instead recommended. The recommended content pages may be those content pages determined to be popular, important, or otherwise interesting based on the number of people that have requested the page. In some cases, the interesting pages may be selected based on some commonalty between the user and a group of users associated with the aggregated data.

Network Computing Environment

Figure 1:
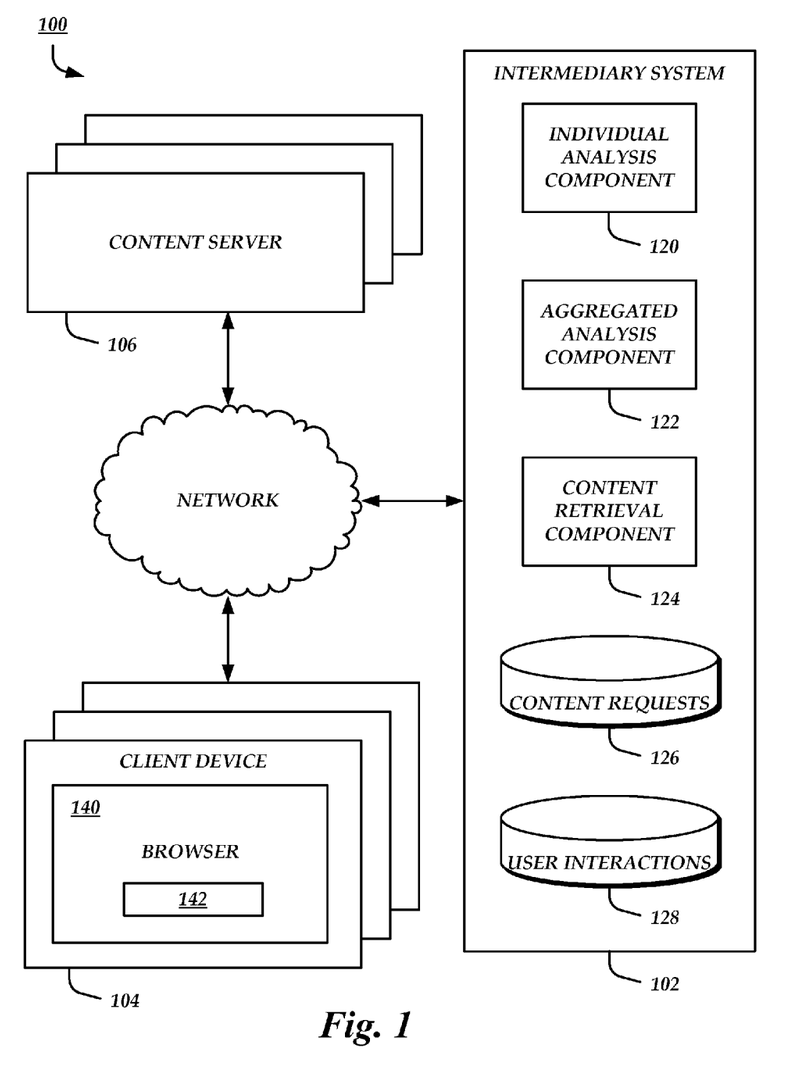
FIG. 1 is a block diagram of an illustrative content delivery environment including multiple client devices, an intermediary system, and multiple content servers.

Turning now to FIG. 1, an illustrative network computing environment in which the features described above may be implemented will be described. The network computing environment 100 may include an intermediary system 102, multiple client devices 104, and multiple content servers 106. The various systems may communicate with each other via a communication network 110. The network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to and/or from the Internet.

The intermediary system 102 can correspond to a logical association of one or more computing devices for servicing requests for hosted content over the network 110. For example, the intermediary system 102 may include an application server, a proxy server, or some other device or group of devices that retrieve content on behalf of client devices 104 and return the content to the requesting client devices 104. Illustratively, the intermediary system 102 of FIG. 1 includes a number of components to implement the analysis of user data and generation of suggested browsing sessions, such as an individual analysis component 120, an aggregated analysis component 122, a content retrieval component 124, and data stores for content request data 126 and user interaction data 128.

As will be recognized, the various features described herein can also be implemented without an intermediary system. For example, a browser application 140, browser plug-in, or some other component on the client device 104 can be configured to monitor/record the user behaviors on the client device 104, and to use the recorded behaviors to create suggested browsing sessions on that client device 104. As another example, the browser application 140, browser plug-in, or other component on the client device 104 could retrieve definitions of suggested browsing sessions from a designated (non-intermediary) server that generates such definitions based on monitored browsing behaviors of many users. The designated server in such embodiments could collect the behavioral data from Internet Service Providers, browsers 140 or browser toolbars that are configured to report user behaviors, and/or various other sources. Thus, in some embodiments, the intermediary system 102 may be omitted, and the various analysis tasks described herein may be performed by another type of system.

An individual analysis component 120 may be configured to analyze the content request data 126 and user interaction data 128 of a single user in order to detect patterns which may form the basis of a suggested browsing session. The individual analysis component 120 may be implemented as a hardware component of the intermediary system 102 or as a combination of hardware and software executing on the hardware. An aggregated analysis component 122 may be configured to analyze the content request data 126 and user interaction data 128 of any number of users in order to determine content recommendations for a user. The aggregated analysis component 122 may be implemented as a hardware component of the content server or as a combination of hardware and software executing on the hardware, similar to the individual analysis component 120.

A content request data store 126 may be configured to store records, files, and other objects corresponding to content requests made by various client devices 104. The content request data store 126 may correspond to a file system, a relational database, or some other electronic data store. The user interaction data store 128 may be configured to store records, files, and other objects corresponding to user interactions performed on various client devices 104. The user interaction data store 128 may correspond to a file system, a relational database, or some other electronic data store, similar to the content request data store 126.

In some embodiments, the intermediary system 102 may include additional or fewer components than illustrated in FIG. 1. For example, the intermediary system 102 may not include a content retrieval component 124, or it may include or otherwise be associated with various additional computing resources, such as content delivery network (CDN) systems, domain name system (DSN) servers, and the like.

The client devices 104 may correspond to a wide variety of computing devices, including personal computing devices, laptop computing devices, hand held computing devices, terminal computing devices, mobile devices (e.g., mobile phones, tablet computing devices, etc.), wireless devices, electronic readers, media players, and various other electronic devices and appliances. A client device 104 may be configured with a browser application 140 to communicate via the network 110 with other computing systems, such the intermediary system 102 or content servers 106, and to request, receive, process, and display content. The browser 140 may include a session presentation component 142. The session presentation component 142 may receive data from the content retrieval module 124, individual analysis component 120, aggregated analysis component 122, or some other component of the intermediary system 102, and to facilitate the presentation of suggested browsing sessions on the client device 104.

The content server 106 can correspond to a logical association of one or more computing devices for hosting content and servicing requests for the hosted content over the network 110. For example, the content server 106 can include a web server component corresponding to one or more server computing devices for obtaining and processing requests for content (such as content pages) from the intermediary system 102 or a client device 104. In some embodiments, one or more content providers 106 may be associated with a CDN service provider, an application service provider, etc.

Data Flows Between Client and Intermediary

Figure 2:
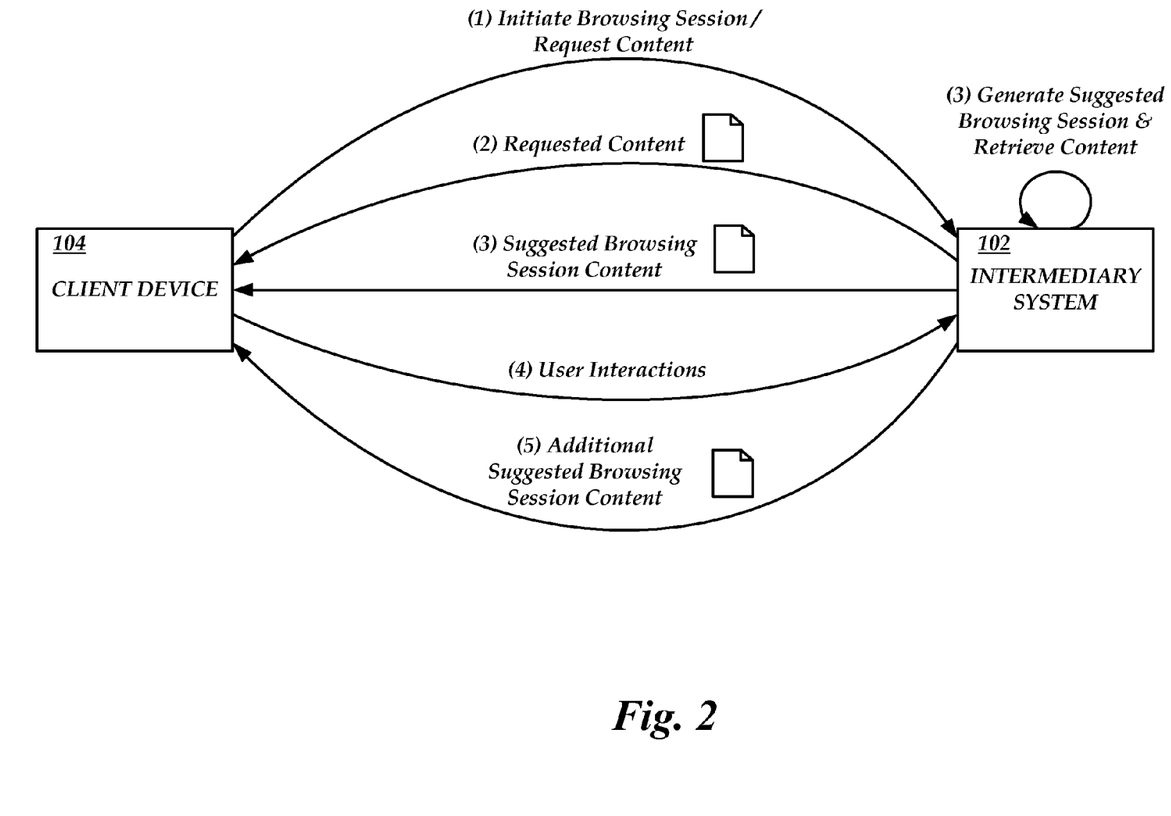
FIG. 2 is a block diagram of illustrative communications and data flows between a client device and an intermediary system.

FIG. 2 illustrates sample interactions and data flows between a client device 104 and an intermediary system 102. The interactions and data flows may occur while a client device 104 is being utilized to browse content. A user may initiate various requests and other actions regarding network content. An intermediary system 102 may respond to the requests and also generate and transmit suggested browsing session data to the client device 104 based on the interactions and requests received from the client device 104. The data flows shown in FIG. 2 and described below are illustrative and not required. In some embodiments, there may be no intermediary system 102, or the client device 104 may interact with the intermediary system 102 in additional or fewer situations than described below.

The client device 104 may initiate a new browsing session at (1), such as by launching a browser application 140 and requesting a content page. The client device 104 may be associated with the intermediary system 102, and accordingly the request or some indication regarding the new browsing session may be transmitted to the intermediary system 102. For example, the client device 104 may utilize proxy services provided by the intermediary system 102, remote content processing or parallel content processing services, and the like.

The intermediary system 102 may respond with the requested content at (2). For example, the intermediary system 102 may contact a content server 106 or other content source to retrieve a requested content page. The content page may include embedded references to, or otherwise be associated with, any number of additional network resources. The content retrieval component 124 or some other component of the intermediary system 102 may process the requested content page, retrieve any embedded resources, and transmit a processed copy of the content page and embedded resources to the client device 104 in response to the request. For example, the intermediary system 102 may utilize the content retrieval component 124 to partially or completely render the content page. The rendered content may then be transmitted to the client device 104. In some embodiments, the content retrieval component 124 may be in communication with the browser 140 of the client device 104, such that processing from the content retrieval component 124 is automatically reflected at the browser 140 of the client device 104. One example of a content retrieval component 124 executing on an intermediary system 102 or other network computing component, and the browsing configurations and processing that facilitate usage of the content retrieval component 124, is described in U.S. patent application Ser. No. 13/174,589, the disclosure of which is hereby incorporated by reference.

The intermediary system 102 may generate, determine, load, or access a suggested browsing session at (3) based on a number of factors related to the client device 104 or the user thereof. For example, if a request for a news-related content page is received, the intermediary system 102 may determine based on the request and some identifying information, such as a user name associated with the user or the internet protocol (IP) address of the client device 104, that a particular user has initiated a browsing session. According to the request data associated with the user, as analyzed by the individual analysis component 120, the user may typically browse a number of news related content pages. The intermediary system 102 may generate or access a suggested browsing session which includes the typical sequence of news content pages. The intermediary system 102 may also retrieve one or more content pages of the sequence associated with the suggested browsing session.

The intermediary system 102 may begin transmitting the content or other data associated with the suggested browsing session to the client device 104 at (4). The intermediary system 102 may transmit a first content page of a predicted sequence of content pages to the client device 104, or multiple pages of predicted sequence. In some embodiments, all or substantially of the suggested browsing session is transmitted to the client device 104 prior to or concurrently with the initiation of playback of the suggested browsing session on the client device 104. For example, a suggested browsing session may be presented on a client device 104 with little or no input or navigation by the user, similar to viewing a television program or motion picture.

The client device 104 may transmit data regarding user interactions to the intermediary system 102 at (5). The user interactions may include scrolling, clicking, zooming, and panning behaviors performed by users when viewing a specific content page. The data regarding the user interaction may include screen coordinates corresponding to an area of the content page that is zoomed in on, a markup tag corresponding to a link that has been clicked, time and speed measurements regarding how long it took to scroll to the bottom of the content page, and the like. Data regarding the user interactions may be recorded by the browser 140 or some other component of the client device 104, and transmitted to the intermediary system 102 regardless of whether the content associated with the interactions is specifically requested content or content transmitted is part of a suggested browsing session.

The intermediary system 102 may continue to transmit content to the client device 104 at (6) according to the suggested browsing session. For example, the user may be passively consuming a suggested browsing session and not generating any user interaction data. The next content page and subsequent content pages may continue to be retrieved by the intermediary system 102 and transmitted to the client device 104.

Generating Suggested Browsing Sessions

Figure 3:
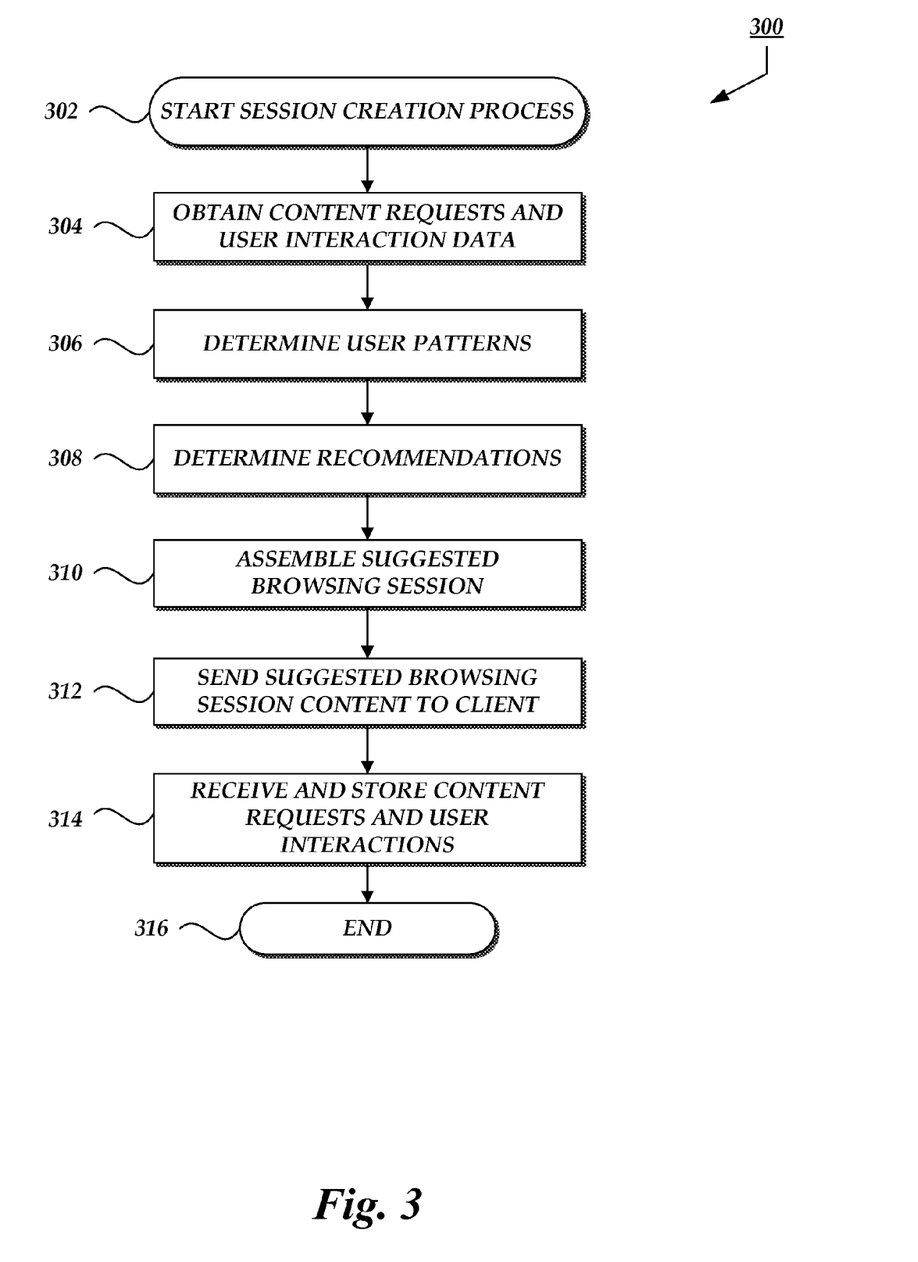
FIG. 3 is a flow diagram of an illustrative process for generating suggested browsing sessions.

Turning now to FIG. 3, an illustrative process 300 for generating a suggested browsing session will be described. The process 300 may be executed by the individual analysis component 120, the aggregated analysis component 122, or some other component associated with the intermediary system 102 (or a separate system). An intermediary system 102 may receive a request, from a client device 104, for content hosted by a content server 106. In addition to responding to the request, the intermediary system 102 may load content request and user interaction data and begin detecting patterns that may be used to generate a suggested browsing session. In some embodiments, the intermediary system 102 may generate suggested browsing sessions in the absence of a current request from a client device 104 for content. For example, the intermediary system 102 may analyze data and generate a suggested browsing session as a batch, scheduled, or background process such that the suggested browsing session for the user has already been defined when a user initiates a content request.

The process 300 begins at block 302. The process 300 may be embodied in a set of executable program instructions and stored on a computer-readable medium drive of a computing device of the intermediary system 102 or some other computing system with which the intermediary system 102 is associated. When the process 300 is initiated, the executable program instructions can be loaded into memory, such as RAM, and executed by one or more processors of the computing system. In some embodiments, the computing system may include multiple computing devices, such as servers, and the process 300 may be executed by multiple servers, serially or in parallel.

At block 304, the individual analysis component 120 or the aggregated analysis component 122 may obtain content request data 126 and user interaction data 128. The data may be previously received data from past content requests and user interactions. In some embodiments, data from a client device 104 may also be analyzed as it is reported to the intermediary system 102 by the browser 140, or shortly thereafter. In some embodiments, suggested browsing sessions can be generated based solely on the content requests, without monitoring zooming, panning, etc. In such cases, user interaction data may not be obtained or may not exist.

At block 306, the individual analysis component 120 or some other component of the intermediary system 102 may begin analyzing the content request data 126 and user interaction data 128 for a single client device 104 or user thereof. The individual analysis component 120 may be configured to detect patterns in the data, and, in some embodiments, to take action based on those detected patterns. A pattern may indicate a sequence of content pages that the user typically requests, a time of day that a user typically initiates the sequence, a different sequence of content pages requested at a different time of day or day of the week, etc. For example, a user may request a news content page, a sports content page, and a social networking content page on a substantial number of weekday mornings. Over the course of days, weeks, and potentially years, a data set may be built related to the user's regular browsing habits. The individual analysis component 120 may analyze some or all of that data set and determine with some specificity which news content page, out of the thousands and potentially millions of news content pages available to the user, which the user requests most often. For example, a user may request a specific news content page (e.g.: the landing page of a national news web site) on 50%, 75%, 90%, or more of the weekday mornings for which data is available. The same user may request a specific sports content page after the news content page a statistically significant portion of the time or a number of times exceeding a threshold, and so on.

In addition, browsing patterns and user interaction characteristics may be detected beyond simple sequences of typically requested content pages or other probability calculations of content pages likely to be requested. For example, user interaction data 128 reflecting zooming and scrolling behaviors may be used to build a profile of how a user interacts with the content pages. Reading speed may be inferred from scrolling or panning speed. Subject matter interests may be inferred from searches, link clicks, and zooming behaviors. These and other browsing and interaction characteristics may be substantially unique to a particular user.

At block 308, the aggregated analysis component 122 may determine recommendations by analyzing aggregated behavioral data from a number of different client devices 104 and users. Recommendations may be based on a determination of which content is requested most often or is experiencing an increase in requests, which content is popular during a particular time of day, or content that, while not popular, is nonetheless associated with a number of characteristics shared by other popular content, etc. The recommendations may be general recommendations appropriate for all users, or may be based at least partly on data regarding a specific user and therefore may only be appropriate for a single user. Returning to the previous example, a user may request a specific news content page a substantial percentage of the time. The aggregated analysis component 122 may determine that a second news page is also requested by a statistically significant number of users that request the first news content page. The analysis may be further customized by factoring in the other content pages the user typically requests (e.g.: a sports content page and a social network content page) to determine that a third news page is requested a larger percentage of the time than the previously determined second page.

The aggregated analysis module 122 may be employed to generate a set of recommendations for a given content subject. The recommendations may be customized for a user, based on user data analyzed at block 306 above. In some embodiments, the recommendations may be independent of any user data. For example, an intermediary system 102 may generate a suggested browsing session for a given topic, such as the history of a specific entity. The suggested browsing session may be based on overall popularity of various content pages referencing the entity, on reviews regarding the quality of particular content pages, the reputation of the content sources or authors, etc.

At block 310, the content retrieval component 124 can assemble a suggested browsing session based on the patterns and recommendations determined in block 306 and 308. The suggested browsing session may be assembled into one or more files containing the content pages of the suggested browsing session or links thereto, a collection of records which reference the various content items associated with the suggested browsing session, etc. In some embodiments, the files, records, and other objects that comprise the suggested browsing session definition may include data regarding a presentation sequence for the various content items, and data regarding scrolling, zooming, and other actions to be performed automatically. For example, a file or set or records may be generated which specify the order in which each content item is to be presented to the user, a portion of interest to highlight for the user, a scrolling speed for each content item, and the like.

At block 312, the content retrieval component 124 can transmit the suggested browsing session to a client device 104. In conjunction with the browser 140, the session presentation component 142, or some other component of the client device 104, the intermediary system 102 may cause display of the suggested browsing session. As described below with respect to FIG. 4, a session presentation component 142 may be configured to receive, analyze, and present a suggested browsing session based on the files, records, or other data received from content retrieval component 124 or some other component of the intermediary system 102.

At block 314, the intermediary system 102 can receive and store content requests and user interaction data. The data may be stored in the content requests data store 126 and user interactions data store 128 respectively. In some embodiments, the entire suggested browsing session is not transmitted to the client device 104 prior to or concurrently with the start of presentation of the suggested browsing session on the client device 104. For example, the first several pages of the browsing sequence may be transmitted to the client device 104 at the initiation of suggested browsing session playback. Subsequent pages of the sequence may not be transmitted until user interactions with the client device 104 indicate presentation of the suggested browsing session should continue. For example, if a user activates background tabs that have been created to present content pages of the suggested browsing session, data regarding such interactions may be transmitted to the intermediary system 102, which can proceed to transmit additional pages to the client device 104. If a user does not activate a threshold number of tabs, then transmission of additional content pages may be aborted. Moreover, data regarding these and other interactions may be stored, as described above, to modify and improve the suggested browsing session.

Consuming Suggested Browsing Sessions

Figure 4:
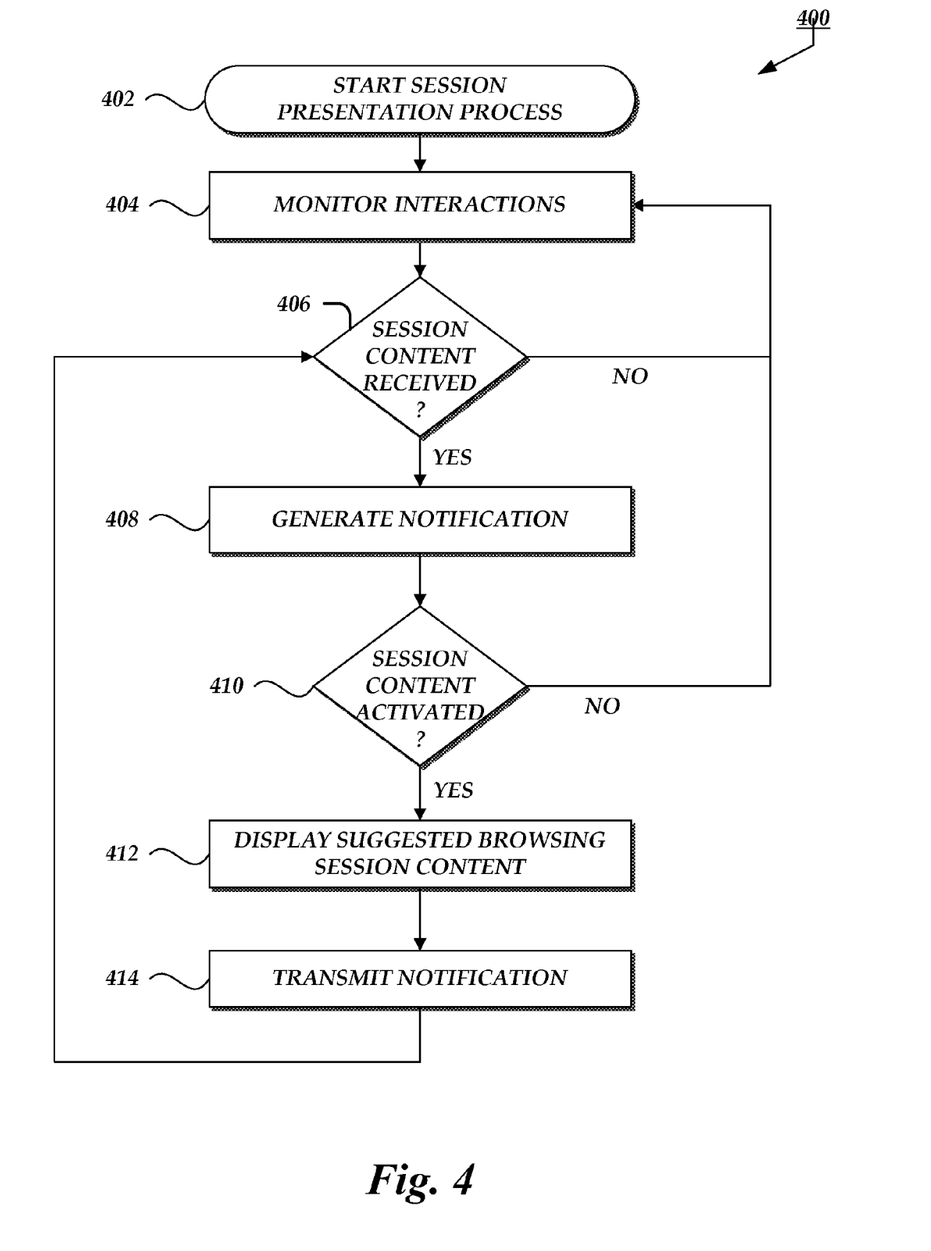
FIG. 4 is a flow diagram of an illustrative process for interacting with a suggested browsing session.

Turning now to FIG. 4, an illustrative process 400 for receiving and displaying a suggested browsing session will be described. The process 400 may be executed by the session presentation component 142 or some other component of the browser 140 or client device 104. The presentation component 142 may be configured to receive suggested browsing session content and data from an intermediary system 102 at the discretion of the intermediary system 102 (e.g.: automatically upon browser startup or in response to a request for a specific content page), or in response to a specific request from a user of the client device 104 (e.g.: the user requests a suggested browsing session of recommended content associated with world news).

The process 400 begins at block 402. Suggested browsing sessions may begin automatically, such as when content is loaded into background tabs. In some embodiments, a user may activate a link or user interface control to select or initiate a suggested browsing session by name, much like bookmarks are selected. The process 400 may be embodied in a set of executable program instructions and stored on a computer-readable medium drive of the client device 104. When the process 400 is initiated, the executable program instructions can be loaded into memory, such as RAM, and executed by one or more processors of the client device 104.

At block 404, the session presentation component 142 may monitor user interactions with the browser 140 and network activity to and from the intermediary system 102. Data regarding user interactions may be transmitted to the intermediary system 102, as described above.

At decision block 406, the session presentation component 142 can determine whether suggested browsing session content has been received. If so, the process 400 may proceed to block 408. Otherwise, the process may return to block 402, where the session presentation component 142 continues to monitor user interactions and network activity.

Figure 5:
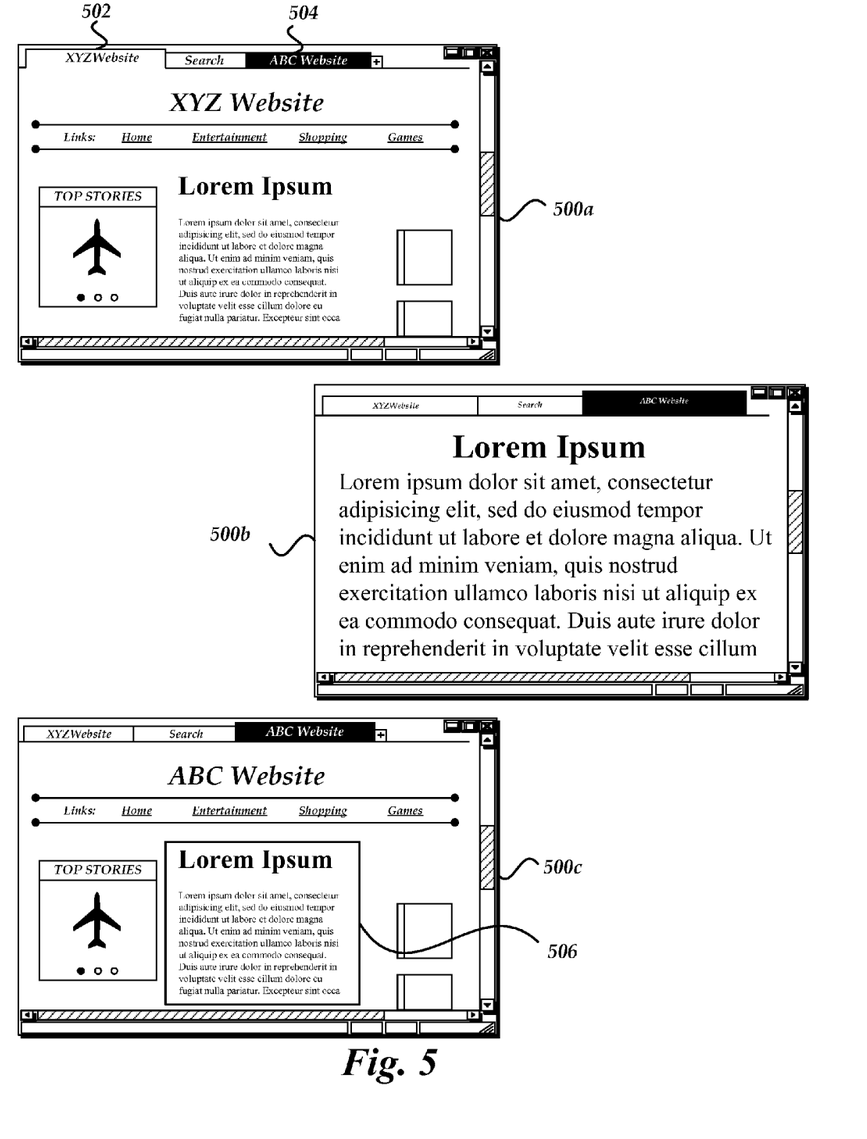
FIG. 5 is a user interface diagram of illustrative visual effects for identifying content of interest.

At block 408, the session presentation component 142 may generate a notification to the user of the client device 104 that suggested browsing session content has been received. For example, the notification may include aural or visual elements, such as beeps, flashing browser tabs, message boxes, and the like. FIG. 5 illustrates a user interface 500a with an active tab 502 and a new tab 504 that has been opened in the background. The color of the new tab 504 has changed to draw the user's attention to it. In addition, the text of the tab indicates that the tab has been automatically opened as part of a suggested browsing session. In some embodiments, no notification is displayed. For example, if the user has initiated the suggested browsing session by activating a user interface control, presentation of the suggested browsing session may commence without a notification to the user.

In some embodiments, no notification is generated to the user. For example, a user may configure the browser 140 or a user account such that a suggested browsing session is always activated without any notification, or activated under certain circumstances without generating a notification. In such cases, when suggested browsing session content is received, it may be automatically displayed to the user without prior notification or without requiring additional interaction from the user.

At decision block 410, the session presentation component 142 can determine whether the suggested browsing session content has been viewed or otherwise activated. For example, if the new tab 504 has been activated, the process may proceed to block 412, where the suggested browsing session content is displayed. Otherwise, the process may return to block 404.

At block 414, the suggested browsing session content may be displayed. Display of the content may include adding visual treatments to the content to indicate areas of potential interest to the user. Such treatments may be useful when the content page is a recommendation or other page that the user does not typically request. The visual treatments can draw the user's attention to the relevant portion of the page so that the user may know why the content page has been included in the suggested browsing session. FIG. 5 illustrates two ways that a user's attention may be directed to the relevant portion of a content page. User interface 500b illustrates a zoomed view of a content page that focuses the display of the client device on only the relevant portion.

When the suggested browsing session content is viewed, the display of the client device 104 may be automatically zoomed to the relevant portion. In some embodiments, a user control, menu option, or touch screen gesture may be enabled. When a user activates the control or menu option or performs the touch screen gesture, the display may be automatically zoomed to the relevant portion. User interface 500c illustrates an outline 506 presented around the relevant portion of the content page. Other visual treatments are possible, including highlighting, underlining, and the like.

At block 414, a notification may be transmitted to the intermediary system 102 that the suggested browsing session content has been activated and viewed. The intermediary system 102 may respond to such a notification with another content page of the suggested browsing session. In some embodiments, the intermediary system 102 may transmit more than one suggested browsing session content page to the client device 104 at a time, or may continue to transmit content pages even though the user has not activated a previously transmitted content page.

Figure 6:
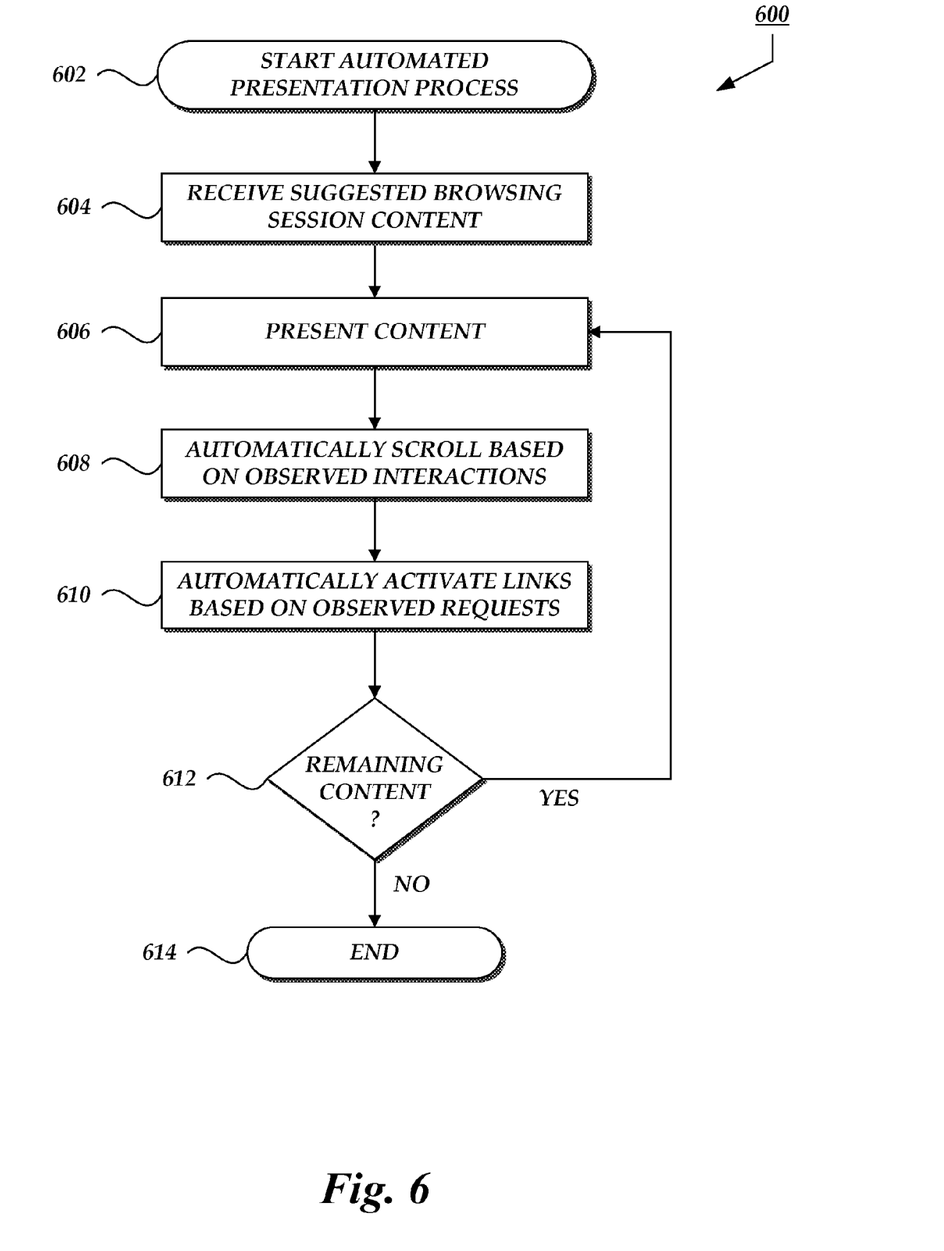
FIG. 6 is a flow diagram of an illustrative process for performing automatic playback of a suggested browsing session.

FIG. 6 is a flow diagram of another illustrative process illustrative process for receiving and presenting a suggested browsing session. The process 600 may be used when presenting a suggested browsing session with automatic content interaction, such as automatic scrolling of content pages, automatic navigation to subsequent pages of the suggested browsing session, etc. The automation of content interaction can result in the presentation of a browsing session to a user that in some ways mimics the presentation of a movie or animation. The user need not perform any specific action in order to further and ultimately finish the presentation of suggested browsing session content after it has begun. The process 600 may be executed by the session presentation component 142 or some other component of the browser 140 or client device 104.

The process 600 begins at block 602. The process 600 may be embodied in a set of executable program instructions and stored on a computer-readable medium drive of the client device 104. When the process 600 is initiated, the executable program instructions can be loaded into memory, such as RAM, and executed by one or more processors of the client device 104.

At block 604, the session presentation component 142 or some other component of the client device 104 may receive suggested browsing session content from an intermediary system 102 or other system. At block 606, the suggested browsing session content may be displayed or otherwise presented within the browser 140.

At block 608, automatic scrolling may be initiated. As described above, data regarding a user's interactions with a page may be recorded and analyzed. The data may include, among other things, a measurement of scrolling speed, sometimes tailored to each content page requested by the user. The intermediary system 102 may include data regarding the scrolling speed, which may roughly correlate to reading speed, in the suggested browsing session. Accordingly, the session presentation component 142 may implement automatic scrolling for a particular page if such data is present. In some embodiments, the automatic scrolling may be overridden by a user, for example by initiating manual scrolling, or by activating a button to pause or stop automatic scrolling or automatic content interaction.

At block 610, automatic selection of links may be initiated. As described above, data regarding a user's interests, such as subject matter, may be recorded and analyzed. In addition, data regarding a number of other user's interests may be recorded and analyzed. Links to content pages that may be of interest to the user, such as recommendations based on browsing activity of other users with similar interests or characteristics, may be automatically activated during presentation of a suggested browsing session with automatic content interaction enabled. In some embodiments, automatic selection of links may be manually overridden, as described above with respect to automatic scrolling.

In addition to automated scrolling and selection of links, other user interactions may be automatically performed during presentation of a suggested browsing session. For example, the browser 140 may support different views, such as a standard browser view, a full screen view that expands the content display pane to the edges of the screen, and a reading view that presents the primary textual content of a content page without images, user interface controls, advertisements, and the like. The browser 140 or some component of the intermediary system 102 may detect that for content from certain sources (e.g.: content pages from a financial news provider) or certain types of content (e.g.: articles), the user typically activates an alternate view of the browser such as the reading view. During suggested browsing session playback, the alternate view may be automatically activated when such content is displayed. In another example, it may be detected that the user typically activates embedded media (e.g.: videos) when available in content pages from certain sources, and such embedded media may be automatically activated when available. Other examples include automatically applying changes to fonts, backgrounds, and other aspects of content pages as it is detected that a user typically applies such changes to content from certain sources or to certain types of content.

At decision block 612, the session presentation component 142 may determine whether additional content pages remain to be presented. If so, the process may return to block 606, where a tab is activated or the browser 140 navigates to the next content page of the suggested browsing session. Otherwise, the process 600 terminates at block 614.

Additional Embodiments

The disclosed system for generating suggested browsing sessions can be varied in numerous ways. As one example, a suggested browsing session may be based on the actions of a single user, on the actions of a group of users, or some combination thereof. The browser 140 or some component of the client device 104 may monitor the content requests and/or user interactions of a user and define one or more suggested browsing sessions for the user based on those requests and interactions. In some embodiments, the suggested browsing sessions created by the client device 104 may include recommendations, similar to those created by an intermediary system 102.

A component of an intermediary system 102, if used, may obtain and process request data and user interaction data from the user and define suggested browsing sessions for the user. Optionally, data received from multiple users may be processed to generate recommendations for inclusion in an individual user's suggested browsing session, or to generate a suggested browsing session based primarily or solely on recommendations or other suggestions.

Suggested browsing sessions, whether created by a client device 104 or an intermediary system 102, may be altered based on requests that are made during a browsing session. In some embodiments, a browsing session may be a period of substantially continuous browsing activity. For example, a user may make several requests over the course of an hour, scrolling through content pages and navigating to other pages. The user may then make no further requests or interactions with the content for a period of time, such as 1 day, 1 hour, 15 minutes, etc. During the period of inactivity, the user may not power down the client device 104, close the browser 140, or otherwise take an affirmative action signifying the end of the browsing session. Accordingly, the end of a browsing session may be identified by a period of inactivity from a content interaction perspective.

User requests and interactions during a browsing session may be used to alter a suggested browsing session, even if the suggested browsing session is active on the client device 104. For example, recommendations may be altered if user interactions indicate that the user is navigating to additional content pages based on content that is displayed. The suggested browsing session may be altered to include more recommendations than normal in such cases.

As another example, content pages for the suggested browsing session may be retrieved by the client device 104 rather than received from an intermediary system 102. For example, content pages may be prefetched by the browser 140 or some other component of the client device 104 based on a suggested browsing session determined at the client device 104 or based on a suggested browsing session definition received from an intermediary system 102 or other device.

As a further example, suggested browsing sessions may be based on the form factor or other characteristics of the target client device 104, such as speed of network connection and available computing capacity. Suggested browsing session sequences may be different depending on device characteristics, such as mobile devices being associated with requests for different content pages than desktop computers. Recommendations may be tailored for a specific form factor, such as low resolution or text-based content for mobile devices, high-resolution or computationally intensive content for desktop devices, and so on. Available drivers and software on the client device 104 may be considered as well. For example, a Flash-heavy content page may not be suggested for a client device 104 that does not support the Flash media type.

Terminology

Depending on the embodiment, certain acts, events, or functions of any of the processes or algorithms described herein can be performed in a different sequence, can be added, merged, or left out all together (e.g., not all described operations or events are necessary for the practice of the algorithm). Moreover, in certain embodiments, operations or events can be performed concurrently, e.g., through multithreaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system comprising:
  one or more processors and a computer-readable memory storing instructions that are operable, when executed by the one or more processors, to cause the one or more processors to at least:
    obtain information describing one or more prior browsing sessions of a user of a first client device, the information identifying a plurality of requested content pages and user interaction data for the requested content pages indicating, at least, an amount of determined view time during the prior browsing sessions;

generate using the information describing browsing sessions, a suggested browsing session for the first client device indicating:

a content request pattern comprising a sequence of content pages selected from the plurality of content pages, each selected content page being viewed greater than a threshold number of times as identified in the prior browsing sessions of the user, and the determined view time for each content page; and transmit, to the first client device, information describing the suggested browsing session comprising a first content page included in the sequence of content pages and the determined view time for the first content page, wherein the determined view time for the first content page indicates a duration for the first client device to wait, after the first content page is accessed, to provide an indication for presentation identifying that a second, subsequent, content page indicated in the suggested browsing session is available to access.

2. The system of claim 1, wherein the information describing the suggested browsing session is transmitted in response to receiving, from the first client device, one of: a request for the first content page, or information identifying a selection of a user interface control to receive the suggested browsing session, or information identifying an initiation of a browser session.

3. The system of claim 1, wherein the instructions are further operable to cause the one or more processors to:

obtain information describing one or more browsing sessions of other users, the information identifying an additional plurality of content pages;

determine a recommended content page based at least in part on the plurality of additional content pages, wherein the recommended content page is not included in the plurality of content pages requested by the user; and transmit, to the first client device, the recommended content page.

4. The system of claim 1, wherein the user interaction data, for each requested content page, further indicates scrolling speeds by the user on the content page, portions of the content page that were zoomed by the user, or panning speeds by the user on the content page, and wherein the instructions are further operable to cause the one or more processors to:

determine, using the user interaction data for the first content page, a content interaction pattern for the first content page, wherein the first content interaction pattern indicates at least one of the following: a speed to scroll the first content page, a portion of the first content page to zoom in, a speed to pan the first content page; and transmit, to the first client device, the data regarding the content interaction pattern for the first client device to use when presenting the first content page.

5. The system of claim 1, wherein each browsing session is associated with a particular time of day, and wherein determining a suggested browsing session is based, at least in part, on a current time of day.

6. The system of claim 1, further comprising a browser component executing on the first client device that uses the indication of the determined view time to wait, after the first content page is accessed, to provide, for presentation, the indication for presentation identifying that the second, subsequent, content page is available to access.

7. A computer-implemented method comprising:

obtaining, by a server computer system comprising one or more computing devices, information describing one or more prior browsing sessions of a user of a client device, the information identifying a plurality of requested content pages and user interaction data for the requested content pages indicating, at least, an amount of determined view time during the prior browsing sessions;

generating, using the information describing browsing sessions, a suggested browsing session for the client device indicating:

a content request pattern comprising a sequence of content pages selected from the plurality of content pages, each selected content page being viewed greater than a threshold number of times as identified in the prior browsing sessions of the user, and the determined view time for each content page; and transmitting, to the client device, information describing the suggested browsing session comprising a first content page included in the sequence of content pages and the determined view time for the first content page, wherein the determined view time of the first content page indicates a duration for the client device to wait, after the first content page is accessed, to provide an indication for presentation identifying that a second, subsequent, content page indicated in the suggested browsing session is available to access.

8. The computer-implemented method of claim 7, wherein the plurality of content pages comprise web pages.

9. The computer-implemented method of claim 7, wherein the browsing sessions are associated with a particular time of day, and wherein determining a suggested browsing session is based, at least in part, on a current time of day.

10. The computer-implemented method of claim 7, wherein the user interaction data further indicates scrolling speeds by the user on the content pages, portions of the content pages that were zoomed by the user, or panning speeds by the user on the content pages, the method further comprising:

determining, using the user interaction data for the first content page, a content interaction pattern for the first content page, wherein the first content interaction pattern indicates at least one of the following: a speed to scroll the first content page, a portion of the first content page to zoom in, a speed to pan the first content page; and transmitting, to the client device, the data regarding the content interaction pattern for the client device to use when presenting the first content page.

11. The computer-implemented method of claim 7, wherein the server computing system comprises an intermediary system, and wherein the intermediary system is not an origin server of any content page of the plurality of content pages.

12. The computer-implemented method of claim 7, further comprising:

receiving, from the client device, a request for a content page not included in the sequence of content pages; and modifying the sequence of content pages based at least in part on the received request.

13. The computer-implemented method of claim 7, further comprising:
   determining a recommended content page based at least in part on information describing browsing sessions of a plurality of other users;
   retrieving the recommended content page; and
   transmitting the recommended content page to the client device.

14. The computer-implemented method of claim 13, wherein the recommended content page is further determined based at least in part on the information describing browsing sessions of the user.

15. The computer-implemented method of claim 7, wherein the information describing the suggested browsing session is transmitted in response to receiving, from the client device, one of: a request for the first content page, or information identifying a selection of a user interface control to receive the suggested browsing session.

16. The computer-implemented method of claim 7, further comprising:
   obtaining, by the client device, information indicating access of the first content page, and after waiting, by the client device, for the indicated determined view time, providing, by the client device for presentation, the indication identifying that the second, subsequent, content page is available to access.

17. A non-transitory computer storage medium which stores a browser component comprising executable code that directs a client computing device to perform a process comprising:
   obtaining a first content page of a plurality of content pages, indicated in received information describing a suggested browsing session generated by a server computing system in communication with the client computing device, and information identifying a previous view time associated with the first content page, the plurality of content pages comprising content pages each accessed greater than a threshold number of times by a user of the client computing device in one or more prior browsing sessions;
   providing the first content page for presentation, and recording user interaction data regarding user interactions with the first content page indicating, at least, an amount of updated view time the first content page is accessed;
   determining that the first content page has been accessed for the identified previous view time, and obtaining a second content page indicated in the suggested browsing session with information identifying the previous view time associated with the second content page; and
   providing, for presentation, an indication identifying that the second content page is available to access.

18. The non-transitory computer storage medium of claim 17, wherein the user interaction data further indicates at least one of the following: scrolling speeds of the first content page, portions of the first content page that were zoomed, or panning speeds of the first content page.

19. The non-transitory computer storage medium of claim 17, wherein the process further comprises:
   obtaining, from the server computing system, data associated with the first content page that identifies actions to perform on the presented first content page, including at least one of the following: a speed to scroll the first content page, a portion of the first content page to zoom in, a speed to pan the first content page; and
   reproducing the actions based on the obtained data.

20. The non-transitory computer storage medium of claim 17, wherein providing an indication comprises:
   causing a browser tab associated with a presentation of the second content page to be presented.

21. The non-transitory computer storage medium of claim 17, wherein the process further comprises:
   receiving a recommended content page, wherein the recommended content page shares a characteristic of the first content page, wherein the characteristic comprises a same subject matter or origin server; and
   providing the recommended content page for presentation.

22. The non-transitory computer storage medium of claim 17, wherein the information describing the suggested browsing session is received in response to providing information, to the server computing system, identifying an initiation of a browser session.

23. The non-transitory computer storage medium of claim 17, wherein the first content page and second content page are obtained from the received information describing the suggested browsing session.

24. One or more non-transitory computer storage media which store:
   a first executable component, that when executed by one or more processors, cause the one or more processors to generate, based on monitored browsing behaviors of a user, a definition of a suggested browsing session, said definition specifying, at least, a plurality of content pages associated with prior browsing sessions, each content page being viewed greater than a threshold number of times as identified in the prior browsing sessions, the plurality of content pages including a first content page and a second content page, and information identifying determined view times for the the content pages; and
   a second executable component, that when executed by one or more processors, cause the one or more processors to:
     use the definition of the suggested browsing session to cause the first content page and the second content page to be prefetched,
     present the first content page, and
     determine that the first content page has been accessed for the determined view time, and present an indication that the second content page is available to view.

25. The one or more non-transitory computer storage media of claim 24, wherein the first executable component generates said definition based at least partly on a detected pattern with which content pages are requested by the user.

26. The one or more non-transitory computer storage media of claim 25, wherein the detected pattern is based at least partly on a time in which the content pages are requested by the user.

27. The one or more non-transitory computer storage media of claim 24, wherein the first executable component generates said definition based at least partly on data regarding content page requests associated with a plurality of user devices.

28. The one or more non-transitory computer storage media of claim 24, wherein the suggested browsing session is determined based at least partly on a form factor or network connection characteristic of a user device of the user.

29. The one or more non-transitory computer storage media of claim 24, wherein the second executable component causes the prefetched plurality of content pages to be presented on the user device via a corresponding sequence of browser tabs.

30. The one or more non-transitory computer storage media of claim 29, wherein the indication that the second content page is available to view is a highlighting of a browser tab associated with the second content page.

31. The one or more non-transitory computer storage media of claim 24, wherein the second executable component runs on a user device of the user, and the first executable component runs on a server that is separate from the user device.

\* \* \* \* \*